UNITED STATES PATENT OFFICE.

KONSTANTIN TARASSOFF, OF MOSCOW, RUSSIA.

MANUFACTURING CONDENSATION PRODUCTS FROM PHENOL, FORMALDEHYDE, AND THE LIKE.

1,216,515. Specification of Letters Patent. Patented Feb. 20, 1917.

No Drawing. Application filed February 21, 1914. Serial No. 820,304.

*To all whom it may concern:*

Be it known that I, KONSTANTIN TARASSOFF, a subject of the Czar of Russia, and residing at Moscow, Russia, have invented certain new and useful Improvements in Manufacturing Condensation Products from Phenol, Formaldehyde, and the like, of which the following is a specification.

This invention relates to the manufacture of condensation products from phenol, formaldehyde and the like.

It is already known that, when formaldehyde or its polymers are allowed to act on phenol or its homologues, hard, resin-like products of a high molecular weight are formed, which have found extensive use in the various arts. Such products are formed from the aforementioned substances particularly easily, if the reaction takes place in the presence of certain acid, alkaline or saline reagents, which act as catalysts. According to the relative quantity of the constituents, temperature and other conditions of the reaction, either fusible amorphous masses, so called artificial shellacs, which are soluble in alcohol, or infusible and insoluble products of condensation, so called bakelites, resinites, condensites and the like are formed.

The technically valuable properties of these products are chiefly their great hardness and capacity of resisting atmospheric influence and chemical and mechanical action. These products however, possess comparatively little elasticity, are brittle, and are easily shattered by impact or bending, so that the manufacture of various articles therefrom is rendered very difficult.

It has now been found that, if, for the purpose of manufacturing condensation products of this type, formaldehyde or its polymers or equivalents for instance hexamethylene tetramin is allowed to react not with phenols but on mixtures of phenols and sulfo-compounds possessing emulsifying properties, for instance, sulfonated fats and oils, for example sulfonated castor oil, sulfonated cotton seed oil, sulfonated sunflower seed oil, aromatic sulfo fatty acids, obtained by the action of concentrated sulfuric acid on a mixture of olein or various fatty oils with aromatic hydrocarbons, or the sulfo-acids obtained in any known manner from the sulfonation products of naphtha, its distillates or other hydrocarbon oils, certain condensation products are obtained of novel compositions, and properties and which, similar to the bakelites, possess great hardness and capacity of resisting mechanical and chemical action, but, in contradistinction thereto, they possess a much higher degree of elasticity and therefore are not so easily fractured by impact when knocked, nor so easily shattered when subjected to blows, and further they can be very easily turned, carved, planed, and subjected to similar operations.

The sulfonated oils and sulfo-acids required for the process according to the invention, need not be manufactured in a pure state from one single material. On the contrary, mixtures of such sulfo-acids and the like, produced from different raw materials, may be employed.

They all combine chemically with the mixture of the phenols with formaldehyde, and the properties of the condensation products may be varied within wide limits according to the proportions of the constituents and the conditions under which the reactions are carried out. For instance, when using large quantities of phenols in relation to the quantity of formaldehyde and sulfo-compounds, and a shorter heating period, easily fusible materials, which are, as a rule, soluble in alcohol, are obtained, whereas, when using large quantities of formaldehyde insoluble, infusible and very hard masses are obtained.

The sulfonated fats and oils to be used for this reaction are produced by treating the common fats and oils with varying quantities of concentrated sulfuric acid, *e. g.* 66 Bé.; so for instance, when employing castor oil, 100 parts by weight of the oil are mixed in the cold with 30 parts by weight of sulfuric acid, and the mixture is then washed with water and a solution of common salt, as in the manufacture of Turkey-red oil.

In practice the condensing process according to the invention, is carried out in conditions which are similar to those usually obtaining under the known processes of this type but with the difference that it is unnecessary to add mineral acids or other catalysts to the mixture in order to facilitate the reaction.

The process is carried out rapidly and uniformly in the absence of such agents, and the sulfonated oils not only enter into the composition of the products but also act as catalysts during condensation.

In this respect, particularly conspicuous are the above mentioned sulfo-acids, which are formed by the sulfonation of the naphtha-hydrocarbons, and the aromatic sulfo-fatty acids, which, as is well known, possess a great emulsifying and dissolving capacity. The presence of such sulfo-acids, even in small quantities, favorably affects the process and causes the formation of homogeneous and perfect products. Further, much less aldehyde is necessary for the manufacture of such products.

*Example I.*

200 parts by weight of commercial carbolic acid are mixed with 50 parts of sulfonated castor oil, 130 parts of 40% formalin and 200 parts of acidified water, acidulated for instance with sulfuric acid. The mixture is thoroughly stirred and heated until the commencement of the reaction. If, in consequence of self-heating, the mixture begins to boil, and if a thick layer of oil is precipitated or deposited on the bottom, the supply of heat is interrupted for some time, and then continued again until the resin-like product, which separates out, possesses the property of coagulating and forming a hard mass when cooled. This mass, for the purpose of removing the surplus reagents which have not been affected, is thoroughly washed with water, and, in order to keep it colorless, is treated for instance with an aqueous solution of sulfurous acid. By this means about 300 parts by weight of non-transparent, perfectly white or light gray fusible condensation product is obtained, which, when mixed with alcohol, forms a perfectly clear and practically colorless solution. If a surface is coated with such a solution, after evaporation of the alcohol, a shiny, firm and easily polished coating remains.

If in the aforementioned process, relatively large quantities of formaldehyde and sulfonated castor oil are used, and if the mixture is subjected to an energetic and continuous heating, a very hard, infusible and insoluble product is obtained.

*Example II.*

A mixture of 200 parts by weight of sulfonated castor oil 200 parts of carbolic acid, 98–100%, 30 parts of sulfo-acids, 70%, obtained by sulfonation of the naphtha distillate of vaseline oil and 120 parts of formaldehyde, 40%, by continuous stirring, becomes heated up to 50–60°, and after a certain time a rather violent ebullition takes place.

The mixture is allowed to stand undisturbed, until the boiling ceases, then it is again stirred from time to time until the temperature falls to 30–40° C., then another 120 parts by weight of formaldehyde are introduced into it, stirred, the mixture is allowed to stand for the escape of air bubbles, stirred again until it becomes more dense; the result is a perfectly homogeneous mass, which is then poured into forms and is kept there at an ordinary temperature during 10–12 hours, then during about half-hour in water heated to 75°, then to 90° and finally 2–3 hours in boiling water. The yield amounts to about 520 parts by weight of perfectly homogeneous white or light yellow, non-transparent, insoluble and infusible material.

*Example III.*

30 grams of aromatic sulfo-fatty acids, for instance in the form of the well known Twitchell reagent for splitting fats which according to the German Patent No. 114,491 cl. 23d is obtained by allowing concentrated sulfuric acid to act on a mixture of naphthalene with commercial oleic acid in molecular proportions, are mixed with 100 grams of commercial carbolic acid and 50 grams of formalin, 40%, and the mixture is carefully heated to 30–35°. Already at this temperature reaction begins, which in consequence of self-heating is accompanied by a somewhat violent ebullition. A viscous oily layer is precipitated. The liquid above is removed partly by pouring off, and partly by evaporation. Thus altogether about 40 grams of water are removed from the mass, and the mass is cooled to 30° C., mixed with a further 40 grams of formaldehyde and is allowed to stand in order to insure the escape of air-bubbles. The viscous mass may then be poured into forms and after standing and being heated at first to 75°, then to 70° and 100° may be transformed into the solid state. Finally about 190 grams of a completely homogeneous, solid and elastic mass free from cracks and bubbles is obtained. Evidently a part of the water combines with the final product of solidification, which accounts for the large escape of it in comparison with the materials taken for the reaction of the materials.

*Example IV.*

Sunflower seed oil is sulfonated. For this purpose it is heated with sulfuric acid 66° at the temperature of 25–30° C. For 5 parts by weight 1½ parts of acid may be taken. The mixture is allowed to stand during about 20 hours and is then washed by an equal volume of water at the temperature of 40–45°, the water is poured off and the oil is washed with a strong solution of salt.

50 grams of sulfonated sunflower-seed oil, 100 grams of carbolic acid, 98–100%, 10 grams of sulfo-acids, obtained by sulfonating a raw naphtha distillate, for instance vaseline oil, sp. gr. 0.880, and 50 grams of formaldehyde are stirred and heated to 50–55°; after this the heating is stopped, and the stirring is continued until the reaction takes place, which is accompanied by violent ebullition. When the ebullition has terminated, the solution is again thoroughly stirred, allowed to stand and 40 grams of water are removed by decantation and evaporation as described in the previous example. Then, when the temperature has fallen to 40°, a further 40 grams of formaldehyde are added and when the mixture has become somewhat viscous it is poured into molds and treated as described in the previous Example III. 197–215 grams of a light gray product are obtained. Under the same conditions a similar product is obtained if instead of sunflower seed oil, another oil, for example, rape oil, be used.

The conditions of the condensation process described in the aforementioned examples, as well as the relative quantities of the three constituents may be varied within wide limits, so that the properties as regards durability, hardness and elasticity of the final product may be correspondingly varied.

In all cases the processes of formation of the insoluble solid products are more or less similar. During the first phase a liquid oily product is formed, which when heated, becomes gradually more viscous and is subsequently converted into an elastic resin or rubber-like mass and finally into a completely hard, infusible mass similar to bakelite. This conversion of the liquid product of condensation into a solid substance is effected more rapidly the higher the temperature to which the product is heated. At normal temperatures the hardening process is very slow, and in some cases is altogether suppressed.

The semi-solid resin or rubber-like intermediate product is plastic, when heated, further it may be cut, and the separate pieces may be fused together, etc. It may be given the desired form and shape in any suitable known manner, for instance by pressing or heating the liquid condensation product in molds, and by subsequently heating to a temperature of 100° to 200° C. or the like, and is converted into the hard and infusible final condensation product, which retains the form and shape of the intermediate product.

The liquid and resin like or rubber-like intermediate condensation products easily mix with other substances, for instance, sand, sawdust, asbestos, fibers of cellular substances and the like. When heated, the final product in forming mixes most thoroughly with these substances which serve as filling materials. By introducing these filling materials, it is possible to impart to the final products different physical properties.

Generally speaking, the method of carrying the condensation process into effect may be varied within the widest limits, depending upon the proportions of the raw materials and the character of the articles to be manufactured.

Similar products are also obtained by substituting for the formaldehyde its polymers, for instance paraformaldehyde, and tri-oxy-methylene, as well as hexa-methylene-tetramin, and other substances containing active methylene groups and the term formaldehyde as employed in the claims includes such known alternatives.

Having now particularly described and ascertained the nature of my said invention and in what manner the same is to be performed, I declare that what I claim is:—

1. A process for the production of a composition of matter comprising causing to react together a phenol, formaldehyde and a sulfo compound possessing emulsifying properties.

2. A process for the production of a composition of matter comprising causing to react together a phenol, an active methylene group containing compound and a mixture of sulfo compounds possessing emulsifying properties.

3. A process for the production of a composition of matter comprising causing to react together a phenol, an active methylene group containing compound and a sulfonated fat.

4. A process for the production of a composition of matter comprising causing to react together a phenol, formaldehyde and a sulfonated fatty oil.

5. A process for the production of a composition of matter comprising causing to react together a phenol, formaldehyde, a sulfonated fatty oil and sulfo-acids obtained by sulfonating mineral oils.

In testimony whereof I affix my signature in presence of two witnesses.

KONSTANTIN TARASSOFF.

Witnesses:
B. LISSEFF,
L. RÖLL.